INVENTOR
JOHN ADRIAN CHURCHILL
BY [signature]
ATTORNEY

July 2, 1963 J. A. CHURCHILL 3,096,095

SOUND REPRODUCING MACHINES

Filed July 26, 1960 4 Sheets-Sheet 2

INVENTOR
JOHN ADRIAN CHURCHILL
BY [signature]
ATTORNEY

July 2, 1963 J. A. CHURCHILL 3,096,095

SOUND REPRODUCING MACHINES

Filed July 26, 1960 4 Sheets-Sheet 3

INVENTOR
JOHN ADRIAN CHURCHILL
BY [signature]
ATTORNEY

INVENTOR
JOHN ADRIAN CHURCHILL
BY [signature]
ATTORNEY

United States Patent Office 3,096,095
Patented July 2, 1963

3,096,095

SOUND REPRODUCING MACHINES

John Adrian Churchill, Thorpe-le-Soken, England, assignor to Foster-Mallard Limited, London, England Filed July 26, 1960, Ser. No. 45,385
5 Claims. (Cl. 274—10)

This invention relates to sound reproducing machines of the kind in which grooved disc-shaped records are used in association with a pick-up device, means being provided to support a plurality of records in an upper position above a turntable and to drop them one-by-one on to the turntable for playing, the movements of the pick-up device between playing operations, and the dropping of the records, being controlled by a rotary control member brought into operation to effect a control cycle at the end of each playing operation.

The invention provides a mechanism for controlling, during the record-changing cycles of the machine, the movements of the arm which carries the pick-up device, such mechanism being generally suitable for use in all sound reproducing machines of the kind referred to but, in some of its embodiments, being particularly adapted for use in sound reproducing machines in which the records to be played are stacked concentrically above the turntable and are rotated, the pick-up being provided with an upwardly projecting stylus adapted to co-operate with the grooves on the underside of the lowest record in the stack and play the underside recording thereon before the record is dropped on to the turntable for the playing of the recording on its upper side.

According to the present invention, in a sound reproducing machine of the kind referred to and having the pick-up arm carried by a vertical spindle to which is also fixed a plate lying in a plane perpendicular to the axis of the said spindle, the rotary control member includes a cam co-operating with a follower on an arm oscillated by rotation of the said cam and the arm, which is adapted to releasably engage the said plate to transmit oscillating movement thereto, has a movement greater than is required to move the pick-up arm from its extreme outward to its extreme inward position and occupies, when the control member is inoperative, a position such that the pick-up arm can swing inwards to the full extent without engagement of said arm with the plate, the oscillating movement of the arm causing it to engage the plate, swing it outwardly, return it inwardly to a position determined by a sizing stop and release it in that position, and the vertical movement of the pick-up arm to move the stylus into and out of engagement with the records is effected by a two-armed lever carrying at one end a ramp-unit co-operating with a follower on the oscillating arm and acting at its other end on a slidable stem acting to lift and lower the pick-up arm by moving it about a horizontal pivot.

In a sound reproducing machine adapted for playing the recordings on the undersides of records before they are dropped on to the turntable, the ramp unit is formed with upwardly and downwardly inclined ramp surfaces arranged side-by-side, and means are provided to move the ramp unit laterally relative to the path of the follower on the oscillating arm so as to bring one or another of the said surfaces into the said path.

Preferably, the vertical spindle carrying the pick-up arm is hollow and has fixed to its upper end a bracket carrying the horizontal pivot for the pick-up arm, said horizontal pivot being on the side of the spindle opposite to the pick-up and the slidable stem being mounted in the bore of said spindle.

The arm may have mounted on it a pair of spring fingers formed with co-axial inwardly projecting pips the plate fixed to the vertical spindle being formed on opposite sides with substantially co-extensive grooves extending radially with respect to the said spindle, the said pips engaging in the said grooves to transmit motion from the arm to the plate.

The invention is hereinafter described with reference to the accompanying drawings, in which.

Figures 1, 2:
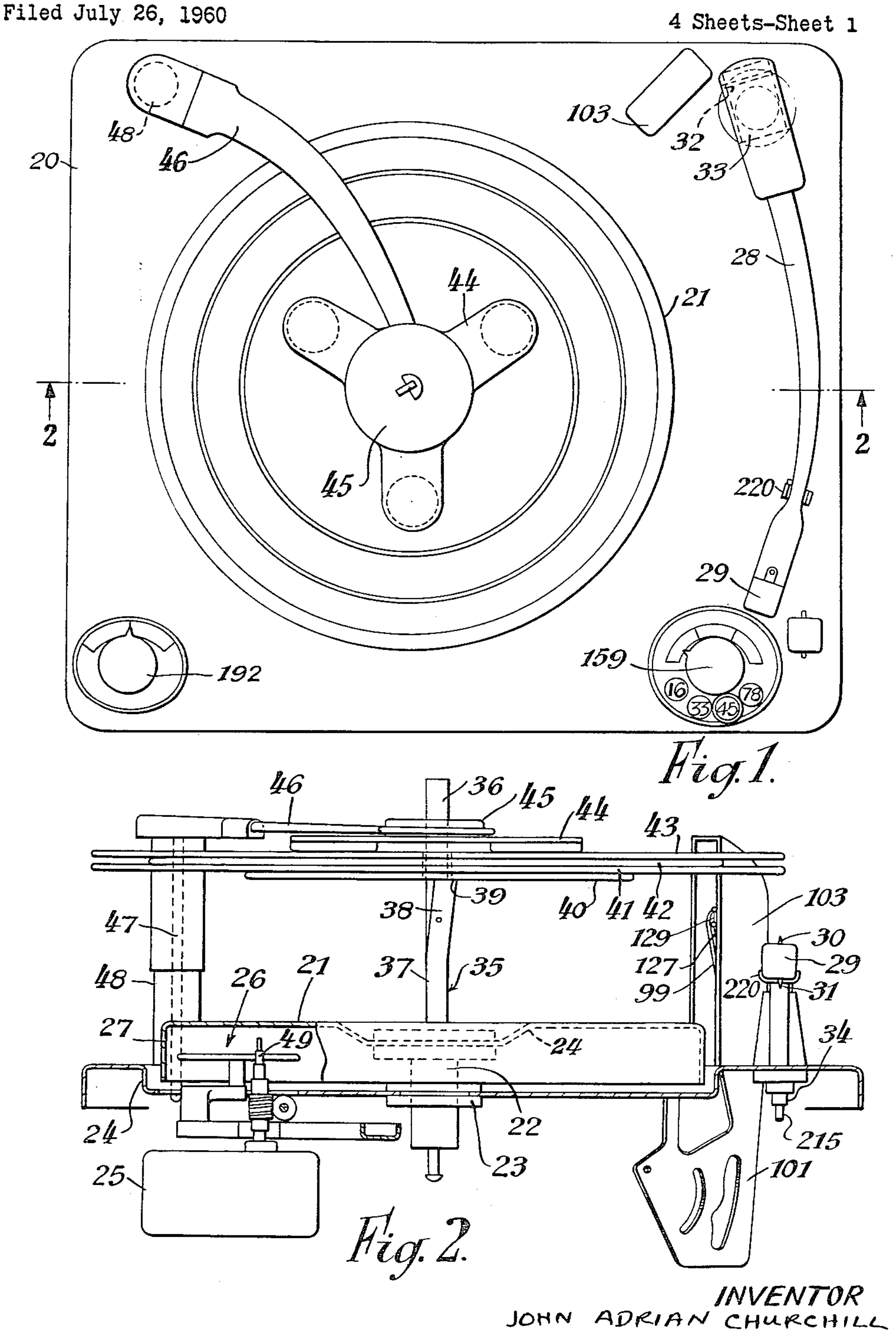
FIGURE 1 is a plan view of a sound reproducing machine embodying the invention.
FIGURE 2 is a sectional elevation on the line 2—2 of FIGURE 1 partly broken away.

Referring to FIGURES 1 and 2 of the drawings the working parts of the sound reproducing machine are mounted on a base-plate 20 which may be mounted in any suitable cabinet, preferably on resilient supports (not shown).

A turntable 21 is mounted on a tubular spindle 22 supported in a bearing 23 at the centre of a depression 24 in the base-plate 20, and is driven by an electric motor 25 supported on the underside of the base-plate 20, through a transmission mechanism 26, more fully described hereinafter, providing a frictional drive to a dependent rim 27 on the turntable.

Figure 5:
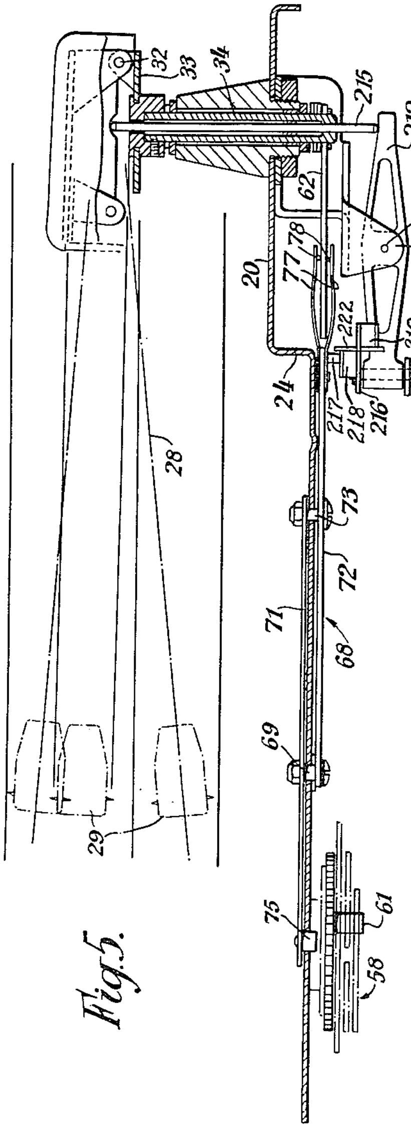
FIGURE 5 is a sectional elevation on the line 5—5 of FIGURE 4.

A pick-up arm 28, carrying a pick-up 29 provided with two styli 30 and 31 respectively projecting in downward and upward directions is mounted (as shown in FIGURE 5) to swing in a vertical plane about a pivot pin 32 carried by a bracket 33 fixed to a vertical tubular spindle 34 mounted in a bearing member fixed to the base-plate, the spindle 34 extending downwardly through the base-plate.

A removable spindle 35, frictionally engaged in the bore of the tubular spindle 22 so as to rotate with the turntable, extends upwardly from the said turntable, the spindle having concentric upper and lower portions 36 and 37 and an oblique intermediate portion 38 the upper end of which forms a shoulder 39 to support a stack of records above the turntable, mechanism being provided to move the records one-by-one off the shoulder and allow them to fall on to the turntable. Records on the spindle are indicated by the reference numerals, 40, 41, 42 and 43, and are held in a horizontal position, and caused to rotate with the turntable 21, by an upper turntable 44 keyed to the spindle and rotatable in a bearing 45 carried by an arm 46 supported on a spindle 47 slidable in a guide pillar 48 standing up from the base-plate 20.

Figure 3:
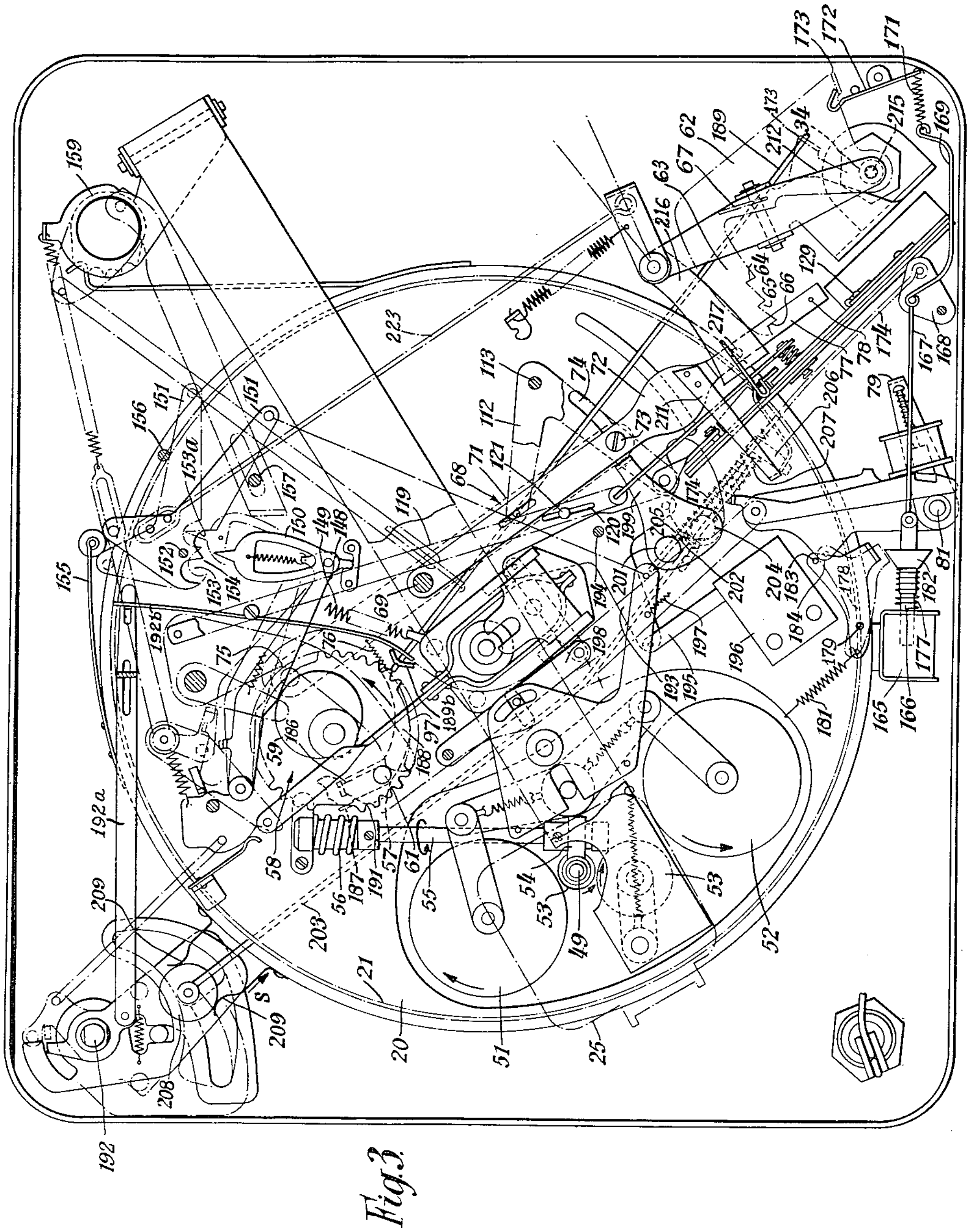
FIGURE 3 is an inverted plan view of the machine, on a larger scale than FIGURE 1, showing the mechanism for controlling the movements of the pick-up arm in the position it occupies when the machine is idle.
Figure 4:
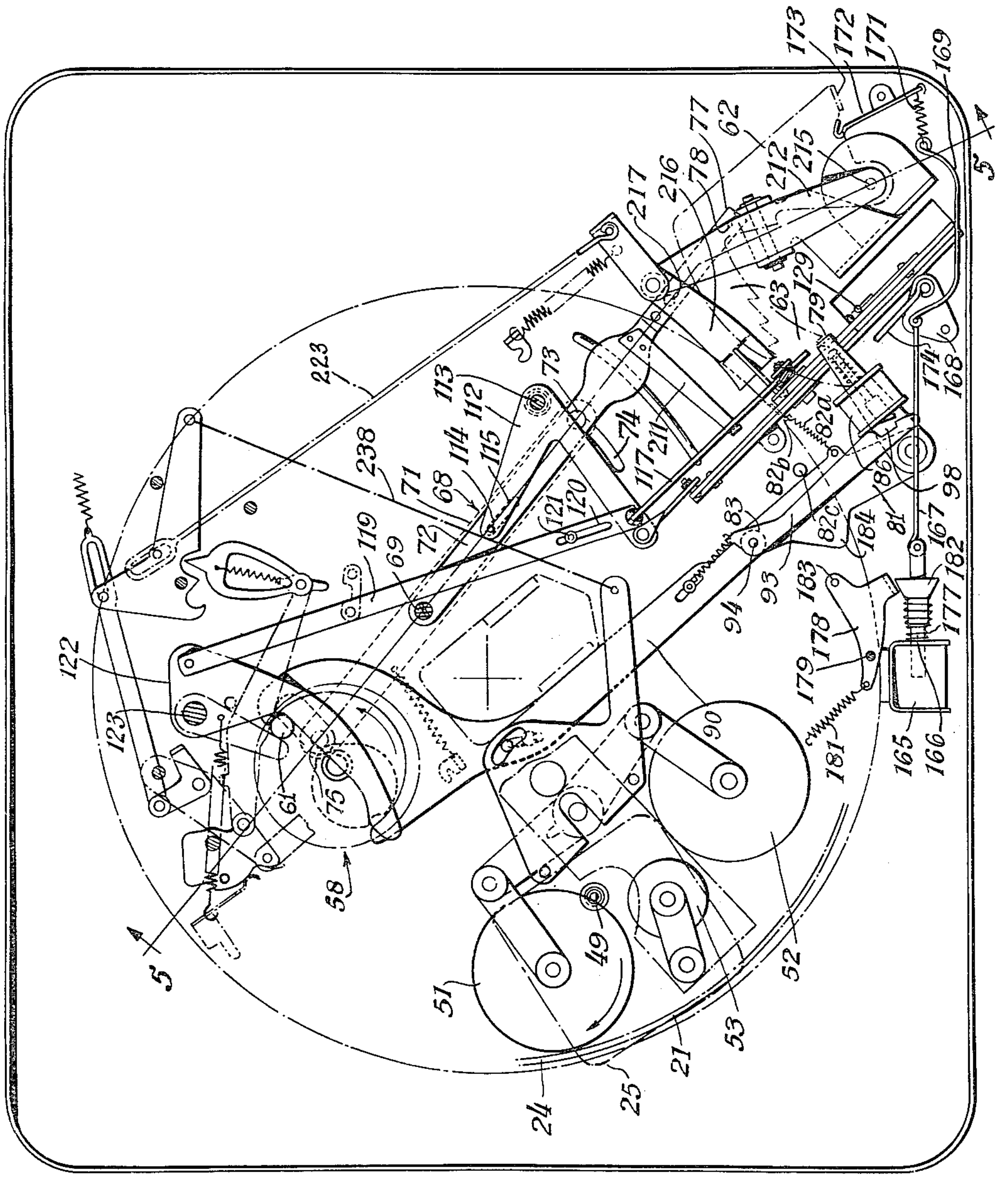
FIGURE 4 is a plan view similar to FIGURE 3 but with some parts omitted, the parts illustrated being in the positions they take up at the mid point of a control cycle.

Referring now to FIGURES 3 and 4 of the drawings, the electric motor 25 has mounted on its spindle a stepped driving shaft 49 adapted to drive the turntable through one or other of two friction wheels 51 and 52, an idler shaft 53 being interposed between the driving wheel 49 and the friction wheel 52 so that the turntable is driven in opposite directions by bringing the friction wheel 51 or the friction wheel 52 into an operative position, and the speed of the turntable is determined by moving the friction wheels vertically to bring them into the plane of the appropriate portion of the driving shaft 49. This driving mechanism is fully described in my U.S. patent application Serial No. 28,142, filed May 10, 1960. The spindle of the electric motor also carries a worm 53A meshing with a worm wheel 54 mounted on a shaft 55 journalled in bearings on the underside of the base-plate 20, the shaft 55 also having mounted on it a worm 56 for driving an interrupted gear 57 forming part of a rotary control unit 58 brought into operation when the machine is started, and at the termination of the playing of each recording, to reset the machine for playing the next recording, or to stop its operation when there are no more records to be played.

The rotary control unit 58 includes a cam 59 and a driving pin 61, both eccentric to the axis of the said control unit, the pin 61 acting on various arms as hereinafter described.

The tubular spindle 34 carries, below the base-plate 20, a plate 62 including an arcuate arm 63 concentric with the spindle 34 and having one end thereof shaped to provide three steps 64, 65, 66. The plate 62 is formed on opposite sides with two grooves, one of which is shown at 67 these grooves being co-extensive and extending radially with respect to the spindle 34.

A compound arm 68, pivoted at 69 on the base-plate and having one of its portions 71 above the base-plate and the other portion 72 below the base-plate has both of its portions attached to the pivot pin at 69, the two portions being also connected one to the other by a pin 73 passing through an arcuate slot 74 in the base-plate. The portion 71 of the arm 68 carries a roller cam follower 75 co-operating with the cam 59, against the profile of which it is urged by a spring 76, the portion 72 of the arm 68 carrying two spring fingers 77 formed with pips 78 adapted to engage in the grooves 67 in the plate 62. The arm 68 normally occupies the position in which it is shown in FIGURE 3, the cam follower 75 being in engagement with the cam 59 at the highest point of the latter, and, during a cycle of the control unit 58, its end on which the spring fingers 77 are mounted swings first anti-clockwise and then clockwise about the pivot 69. At some point during its anti-clockwise swing, depending on the position of the pick-up arm 28, the pips 78 engage in the grooves 67 and motion is transmitted to the plate 62 to swing the pick-up arm 28 outwardly to a maximum outward position, and then to swing the said pick-up arm 28 inwardly to a position for commencing to play the next record, that position being determined by setting a movable stop 79 to be engaged by one or other of the steps 64, 65, 66, on the plate 62.

The position of the stop 79 is controlled by a sizing mechanism which forms no part of the present invention, and will not be described herein.

The driving pin 61 of the control unit 58, during the rotation of the control unit, engages and displaces an arm 148, urged towards the said driving pin 61 by a tension spring 149, to move to-and-fro a pecker member 150 co-operating with a rocking member 151 pivoted at 152 on the base-plate 20, the rocking member 150 being formed with two notches 153 and 153a one on each side of a V-shaped nose 154, the centre line of which passes through the pivot axis 152 of the said rocking member 151, the said rocking member being acted on by a spring 155 which, once the said rocking member has passed a dead-centre position, tends to urge it towards either one of two movement limiting stops 156 and 157, depending on its direction of motion. Depending on the position of the rocking member 151 when the pecker member 150 is operated, the said pecker member is guided by the nose 154 into one or other of the notches 153 and 153a, and moves the rocking member over its dead-center position so that it moves to its other extreme position. Thus the rocking member 151 is moved in opposite directions by successive cycles of the control unit 58, this movement being used to determine whether the pick-up 29 is lifted to play a record above it or lowered to play a record on the turntable 21, whether or not a releasing mechanism is operated to cause a record to drop on to the turntable 21, and in which direction the turntable 21 is rotated for the next playing operation. The rocking member 151 determines the direction of the rotation of the turntable 21 by moving, through a link 258, a plate 235 carrying pins 236 which govern the positions of the friction wheels 51 and 52.

The sizing mechanism includes an arm which moves outwardly across the under surface of the lowermost record in the stack during a control cycle and, if there is no record present, causes the closing of contacts to energise a solenoid coil 165.

The solenoid coil 165 co-operates with an armature 166 (FIGURES 3 and 4) coupled by a link 167 to one corner of a triangular plate 168 pivoted at another corner thereof to the base-plate 20, another link 169, pivoted to the triangular plate 168 co-axially with the link 167, acting through a tension spring 171 on a pivoted latch 172 adapted to engage with a turned-up ear 173 on the plate 62 to hold the pick-up arm 28 in a position clear of the records. To the third corner of the triangular plate 168 is connected one end of a further rod 174.

A spring 177 acting on the armature 166 urges it in a direction to release the latch 172, and the solenoid coil 165, when energised, urges it in the opposite direction. A latch 178, pivoted at 179 on the base-plate 20, is urged by a tension spring 181 about its pivot to engage a collar 182 on the armature 166 and retain the latter in the position to which it is moved when the solenoid coil 165 is energised, the collar 182 having a frusto-conical face co-operating with the latch 178 to move it out of the way as the armature moves under the influence of the solenoid coil. The latch 178 also carries a pin 183 adapted to be engaged by a nose 184 on a supporting arm 81 for the stop 79 to release the said latch 178, the arm 81 being moved to release the latch 178 by a striker 211 carried on the portion 72 of the compound arm 68, as the said arm 68 returns to its normal position.

Figure 7:
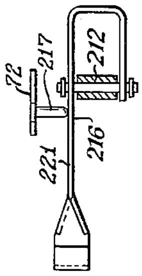
FIGURE 7 is a detail elevation of part of FIGURE 5.

The upward and downward movement of the pick-up arm 28 to bring the pick-up 29 into position for playing records above or on the turntable 21 respectively is effected by a lever 212, pivoted at 213 on a bracket 214 fixed to the base-plate 20, the lever 212 acting at one end on the pick-up arm 28 through a rod 215 extending as shown in FIG. 5 through the tubular spindle 34. The lever 212 is moved up or down at its other end by a double ramp member 216 pivoted to it and moved to bring an upward ramp 218 (FIG. 7) or a downward ramp 219 thereon into alignment with a follower pin 217 carried by the portion 72 of the arm 68. The ramps 218 and 219 are formed at the end of the ramp member 216 remote from its pivotal connection to the lever 212, the remainder of the said unit providing a flat surface 221 from which the ramps diverge upwardly and downwardly a plate 222, perpendicular to the surface 221, separates the two ramps 218 and 219. The ramp member 216 is connected by a link 223 to the rocking member 151, so that it is moved from one position to the other by the said rocking member.

Associated with the pecker member 150 is a bar 158 movable by means of a control knob 159 on the upper side of the turntable from the position shown in FIGURE 3, in which it is clear of the pecker member, to a position in which it deflects the said pecker member towards the left, thus causing it, on each cycle of the control unit 58, to move into the notch 153 on the rocking member, so that the position of the rocking member 151 is not changed, and the machine remains set for playing the upper sides of records on the turntable 21.

The rotary control unit 58, as shown in FIGURE 3, normally occupies a position such that the gap in the teeth of the interrupted gear 57 is opposite the worm 56, so that the latter is free to rotate withou driving said interrupted gear. An arm 186, pivoted on the driving pin 61, is formed with a projection 187 adapted to engage with the thread of the worm 56 so as to cause the latter to be moved far enough to engage its teeth with the said thread, the arm 186 being pivoted co-axially with another arm 188, with which it has a lost-motion connection. The arm 188 is operated by a push rod 189 when the pick-up 29 reaches the inner end of the sound track on a record, the push rod 189 being moved by the ear 173 on the plate 62 already mentioned, which ear, when the pick-up 29 reaches the inner end of the sound track, is in the position shown in the dotted line in FIG. 3. This movement of the push rod 189 causes the projection 187 to engage the worm 56, the said projection being moved to its inoperative position as the control unit 58 approaches the end of a revolution by a shoulder 191 on the arm 188 engaging the worm. The arm 188 is similarly operable to start a control cycle by the actuation of a "start" control 192 the said "start" control acting through a slide bar 192*a* on a resilient lever 192*b* which engages a lug 189*b* on the push rod 189.

A three-armed lever 193 pivoted at 194 on the base-plate 20 has one arm thereof connected by a link 195 to an on-off switch 196 in the circuit of the electric motor 25, and is urged by a tension spring 197 extending between said arm and an anchorage point on the base-plate 20 in a direction to close the switch. Another arm of the lever 193 is linked to a lever 198 arranged, as described in my U.S. patent application, Serial No. 28,142, filed May 10, 1960, with reference to FIG. 4 of the drawings accompanying said application to move the friction wheels 51, 52 towards and away from the turntable rim, and the third arm carries a trigger member 199, pivoted to the said arm. The rod 174 passes through a boss 201 on the trigger member 199, and a coiled compression spring 202, fixed at one end to the rod 174, acts on the said boss, applying, when the plate 168 is rotated by the solenoid 165, a thrust tending to rotate the trigger member 199, clockwise as shown in FIGURE 3, about its pivot. Another rod 203, passing through another boss 204 on the trigger member 199, carries a pair of spaced collars 205 and 206 one on each side of the boss 204, a coiled compression spring 207 between the boss 204 and the collar 206 tending to urge the collar 205 against the boss 204. The other end of the rod 203 carries a spool 208 movable to-and-fro between two spring fingers 209, 209 fixed to the base-plate 20, so as to maintain the said spool in either one of two positions.

The trigger member 199 co-operates with the portion 72 of the arm 68, a down-turned end thereof being urged against the side of the said arm portion 72 when the solenoid coil 165 is energised and moving, during the initial part of the succeeding oscillation of the arm 68, into a position substantially perpendicular thereto, so that on the return movement of the said arm 68 the three-armed lever 193 is rocked to open the switch 196, this movement of the trigger member 199 also moving the spool 208 through the spring fingers 209, 209.

When the machine is not operating, the control unit 58 is stationary, the worm 56 being opposite the gap in the teeth of the gear wheel 57. The arm 68, by reason of the fact that its cam follower 75 is in engagement with the highest point of the cam 59, is at the clockwise extreme of its arc of movement as viewed in FIG. 3, and the rocking member 151 is in such a position that the pin 217 is opposite the downward ramp 219 of the ramp member 216.

The pick-up arm 28 is supported by a rest 220 (FIGS. 1 and 2), so that the pin 217 is not in engagement with the ramp 219, and the said arm is held against inward movement by the latch 172.

The machine is started by moving the spool 208 in the direction of the arrow S in FIGURE 3, this movement being effected by the "start" control 192 (FIGS. 1 and 3), so that the said spool passes between the spring fingers 209, 209 and is held by them in its new position.

Figure 6:
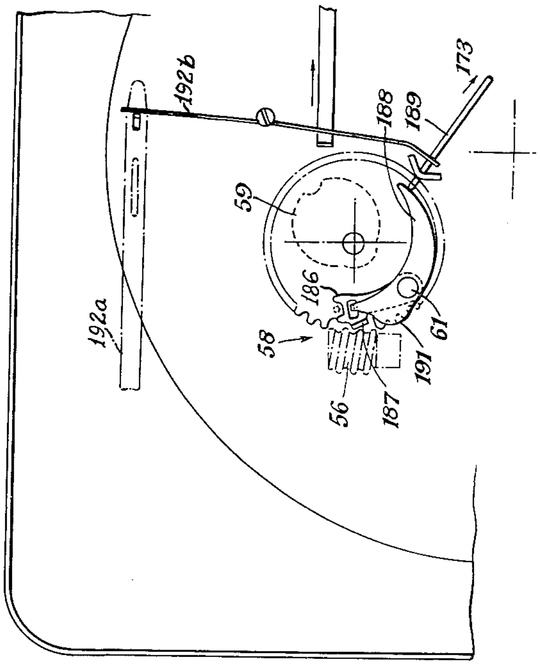
FIGURE 6 is an inverted plan of the control unit in the position for initiating a control cycle.

This movement is transmitted through the rod 203 and the trigger member 199 to the three-armed lever 193 which moves to close the switch 196 and to move the plate 235 carrying the fritcion wheels 51, 52 towards the turntable rim as described in my U.S. patent application No. 28,142, filed May 10, 1960, previously referred to. The rocking member 151 holds the plate 235 in a position such that the friction wheel 52 engages the turntable rim when the said plate 235 is moved bodily by the three-armed lever 193, the rotation of the various elements being indicated by arrows in FIG. 3. The turntable is thus driven in the direction for playing a record resting thereon. The "start" control, acting through the slide bar 192*a*, the resilient lever 192*b* on the push rod 198, also moves the projection 187 on the arm 186 to the position shown in FIG. 6, in which it is in engagement with the worm 56, so that the said worm, which is rotating in the direction indicated by an arrow in FIG. 3, rotates the control unit 58 anti-clockwise as shown in that figure. Thus both the turntable 21 and the control unit 58 are set in rotation.

The cam 59 moves the compound arm 68 so that its end carrying the fingers 77 moves in an anti-clockwise direction, the pick-up arm 28 being lifted off the rest 220 due to the movement of the pin 217 from the ramp 219 on to the surface 221 of the ramp member 216, and the pips 78 engage the grooves 67 in the plate 62 shortly before the arm 68 reaches the end of its swing in this direction, moving the said arm outwardly and causing the latch 172 to disengage the plate 62. At about the position where outward movement of the pick-up arm 28 ceases, the driving pin 61 engages the arm 148 to commence the operative stroke of the pecker member 150, and when the said pecker member has moved far enough to change the position of the rocking member 151, the driving pin 61 operates a driving lever controlling record dropping mechanism which is not described herein, said mechanism being so arranged that the driving lever is effective to operate it only when the rocking member 151 is in the position for playing the top side of a record. The cam 59 has a dwell portion which is traversed by the follower 75 whilst the above-mentioned operations are taking place.

The movement of the rocking member 151 is transmitted by the link 223 to the ramp member 216, thus bringing the upwardly inclined ramp 218 into the path of the pin 217. The friction wheel 52 is also brought to its operative position, so that the direction of rotation of the turntable 21 is reversed.

The continued rotation of the control unit 58 causes the compound arm 68 to swing in the opposite clockwise direction, causing the pick-up arm 28 to swing inwardly until one of the steps 64, 65, 66 on the plate 62 engages the movable stop 79, depending on the setting of the latter by the sizing mechanism. When such engagement takes place, the pips 78 are pulled out of the grooves 67 by continued movement of the compound arm 68, leaving the pick-up arm 28 free. The compound arm 68 then returns to its initial position, where it is beyond the position reached by the steps 64, 65, 66 at the end of the inward swing of the pick-up arm 28. During the last part of this return movement of the arm 68, the upwardly inclined ramp 218 on the ramp member 216 comes into engagement with the pin 217, and the pick-up 29 is raised into engagement with the under-surface of the lowermost record 40 of the records resting on the shoulder 39 of the spindle 35.

The recording on the underside of that record 40 is then played, and, when the pick-up stylus 30 reaches the inner part of the record groove, the arm 186 is again rocked, by movement of the push rod 189, to bring the projection 187 thereon into engagement with the worm 56. The control unit 58 therefore makes another cycle as described above, this time moving the rocking member 151 to the topside play position so that the ramp member 216 is moved to bring the downwardly inclined ramp 219 (FIGS. 5 and 7) into the path of the pin 217. This movement of the rocking member 151 also reverses the direction of rotation of the turntable 21 from topside playing, and renders the record dropping mechanism operative. A record is therefore caused to fall on to the turntable 21, and, during the final movement of the compound arm 68, the pick-up 29 is lowered to bring the stylus 31 into engagement with that record.

Following cycles of movement of the control unit 58 set the machine for alternate playing of undersides and top sides of records until, when the last record has dropped, the absence of a record on the spindle 35 is sensed by a sizing arm and, as a result, the solenoid 165 is energized to rock the trigger member 199, after the compound arm 68 has made the first half of its oscillating movement, to a position substantially at right angles to the said arm 68. The solenoid 165 also sets the latch 172 to engage the ear 173 on the plate 62. When the arm 68 starts to return, the ear 173 engages the latch 172, stopping the inward movement of the pick-up arm 28 when the latter is above the rest 220, the arm 68 continuing its movement and acting, through the trigger member 199, on the three-armed lever 193, to rock the latter so as to open the switch 196 and pull the friction wheels 51 and 52 away from the rim of the turntable. The rocking of the trigger member 199 also moves the rod 203 to displace the spool 208 to its other position, ready for actuation to restart the machine. During the final part of the movement of the arm 68 the pin 217 comes opposite to the downwardly inclined ramp 219 on the ramp member, and the pick-up arm 28 is lowered on to the rest 220. The latch 178 (FIG. 3) is also released, so that the latch 172 is free to disengage when the machine is restarted.

By moving the bar 158 towards the left in FIGURE 3 so that it pushes the pecker member 150 somewhat to the right, the latter is caused, during every cycle of the control unit, to move into the notch 153 in the rocking member 151, with the result that that member remains in the position shown in FIGURE 3. The turntable 21 is therefore driven continuously in the direction for playing the top sides of records, the ramp unit 216 remains in such a position that the pick-up 29 is lowered at the end of each control cycle, and a record is dropped during each control cycle. Thus only the recordings on the top sides of the records are played, the machine being stopped, after playing the last record, in the manner above described.

In a sound-reproducing machine which is able to play only the recordings on the top sides of records after they have fallen on to the turntable, the ramp member 216 is fixed in relation to the lever 212 and has only an upwardly inclined ramp 218 thereon. The rocking member 151 is omitted, and the record dropping mechanism is operated directly, during every cycle of the control unit 58, by the driving pin 61. The reversible driving means for the turntable 21 are also omitted, the latter being driven through a single friction wheel.

I claim:

1. In a sound reproducing machine having a turntable adapted to support records, a pick-up arm, said pick-up arm being provided with at least one stylus thereon for playing said records, a hollow vertical spindle having said pick-up arm pivotally mounted thereon, said pick-up arm having an extreme outward and an extreme inward position, a plate attached to said vertical spindle, and said plate being arranged in a plane perpendicular to said spindle,
- a rotary control unit,
- a cam on said control unit,
- a follower arm having a first follower thereon cooperating with said cam, said follower arm having an oscillating motion imposed upon it by said cam and being adapted to releasably engage said plate for transmitting said oscillating motion thereto, said follower arm further having a movement greater than it is required to move said pick-up arm from said extreme outward to said extreme inward position, and, when said control unit is inoperative, occupying a position such as to enable said pick-up arm to swing inwardly to its full extent without engaging said arm with said plate, a second follower on said follower arm, a two-arm lever, said lever adapted to move said stylus on said pick-up arm in and out of engagement with said records,
- a ramp unit on one arm of said lever, said second follower arm cooperating with said ramp unit.
- and a slidable stem in said hollow vertical spindle for lifting and lowering said pick-up arm, said slidable stem being operatively engaged by the other arm of said two-arm lever.

2. A sound reproducing machine according to claim 1, having means for playing said records on their undersides before they are dropped onto said turntable, upwardly and downwardly inclined ramp surfaces arranged side-by-side on said ramp unit, and means for moving said ramp until laterally relative to the path of said oscillating motion of said follower arm so as to bring either the upwardly or the downwardly inclined ramp surface into said path of said oscillating motion.

3. A sound reproducing machine according to claim 1, said follower arm having a pair of spring fingers mounted thereon, said spring fingers having co-axial inwardly projecting pips, and said plate attached to said vertical spindle having substantially co-extensive grooves on opposite sides thereof, said grooves extending radially with respect to said spindle, said grooves being engaged by said pips for transmitting said oscillating motion from said arm to said plate.

4. A sound reproducing machine according to claim 2, having a rocking member, means operated by said control unit for moving said rocking member in opposite directions during successive cycles of movement of said control unit and linkage means connecting said rocking member with said ramp unit.

5. A sound reproducing machine according to claim 4, having further means for inhibiting the movement of said rocking member so as to retain said ramp unit in a stationary position during successive record playing operations.

References Cited in the file of this patent

UNITED STATES PATENTS

| | | |
|---|---|---|
| 2,570,040 | Thorens | Oct. 2, 1951 |
| 2,628,843 | Comstock | Feb. 17, 1953 |
| 2,665,134 | Giannelli | Jan. 5, 1954 |
| 2,731,272 | Burt | Jan. 17, 1956 |
| 2,841,400 | Mueller | July 1, 1958 |